United States Patent
Tumlin et al.

(10) Patent No.: US 7,217,917 B1
(45) Date of Patent: May 15, 2007

(54) NATURAL GAMMA RAY LOGGING SUB METHOD AND APPARATUS

(76) Inventors: David M. Tumlin, 1037 Jolie Blonde Rd., Breaux Bridge, LA (US) 70517; Robert A. Daigle, 108 Winbourne Ave., Scott, LA (US) 70583

( * ) Notice: Subject to any disclaimer, the term of this patent is extended or adjusted under 35 U.S.C. 154(b) by 0 days.

(21) Appl. No.: 11/524,994

(22) Filed: Sep. 21, 2006

(51) Int. Cl.
*G01V 5/12* (2006.01)
(52) U.S. Cl. .................... 250/256; 250/269.3
(58) Field of Classification Search ........... 250/256, 250/269.3
See application file for complete search history.

(56) References Cited

U.S. PATENT DOCUMENTS

| | | |
|---|---|---|
| 2,320,643 A | 6/1943 | Neufeld |
| 2,549,109 A | 4/1951 | McPhee |
| 3,835,317 A | 9/1974 | Vann |
| 3,962,412 A | 6/1976 | Wolfangel |
| 4,436,996 A | 3/1984 | Arnald et al. |
| 5,285,065 A | 2/1994 | Daigle et al. |

*Primary Examiner*—David Porta
*Assistant Examiner*—Mark R. Gaworecki
(74) *Attorney, Agent, or Firm*—Robert N. Montgomery

(57) ABSTRACT

A natural gamma tag marking materials for sub or permanent markers used in gamma logging operations, such natural gamma materials having a gamma count of between 200 and 1000 counts per second. The instant invention further discloses a typical Sub, for insertion in a drilling operation, utilizing natural gamma element compounds which are considered to be non-hazardous and effective as tag markers when used in wire-line logging operations.

9 Claims, 5 Drawing Sheets

US 7,217,917 B1

NATURAL GAMMA RAY LOGGING SUB METHOD AND APPARATUS

1. FIELD OF THE INVENTION

This invention relates to an improved gamma radiation emitting tool joint referred to as a sub, often used in wire-line logging operations as tag markers or permanent reference points in conjunction with tubing conveyed drilling tools etc. More particularly, the present invention is directed to an improved material and method of conveyance for performing such task.

2. GENERAL BACKGROUND

Radioactive tag markers utilized in a drilling operation are by no means new. However, they have evolved over the years, from permanent markers placed in the casing or tubing, to cobalt pellets implanted into a drilling tube sub. These reference markers are necessary to provide an exact known location for perforating and other such down-hole operations.

Although each joint of drill pipe or tubing is measured prior to insertion in the bore hole, even small measurement errors and coupling differences become cumulative over the hundreds of joints of pipe used in the string, resulting in errors of several feet in some cases. Stretch and bounce in the wire-line while logging the well also plays a large role in drilling tool location error. Therefore, it has been the accepted practice to provide a highly radioactive substance as a detectable tag-marker referencing source, located in the near vicinity of the tool joint. Thus, when the initial subsurface formation log is compared to a through tubing wire-line log, for any given well, in which a tag marking reference source has been placed near the tool joint, a high gamma count spike is detectable and can be accurately located utilizing the standard API gamma ray tubing collar locator scale.

It has been assumed in the past that the radioactive tag marker reference source must have a high gamma count to overcome the natural gamma radiation being emitted by the surrounding subsurface formations. Therefore, high gamma count elements such as cobalt with gamma counts in excess of 3600 counts/sec. are currently being used. High radiation elements, when used in well logging operations, are highly controlled by the Nuclear Regulatory Commission, the Department of Transportation and various environmental agencies, both Federal and State. Personnel must be highly trained and a paper trail must be maintained at all times for the handling of such materials to minimize human exposure to radiation. A license must also be acquired and maintained for each state through which the material passes and expensive equipment must be utilized in the handling and detection process. The necessary equipment cannot be transported quickly by air, if at all, due to these time consuming restrictions.

Accordingly, a gamma ray tag marker that can be detected by the wire-line logging operation that does not exhibit the draw-backs here above mentioned is disclosed. Namely, a less hazardous substance that can be handle without risk to personnel was developed and disclosed in U.S. Pat. No. 6,285,065. However, it has since been found that smaller quantities of the natural gamma ray substances may be used for gamma counts of between 200–1000 gamma counts/sec. than first thought possible. Thereby allowing for less complicated tag marking with greater safety at less expense.

3. SUMMARY OF THE INVENTION

A method and apparatus for transporting and utilizing a natural occurring gamma ray emitting substance in very small quantities as tag markers in wire-line logging operations.

In the preferred embodiment it has been found that very small amounts of a gamma ray counts of 200–1000 gamma counts per second located in specific patterns and locations is sufficient to overcome the surrounding subsurface formations normally found in the Gulf of Mexico. Such earth formations in the Gulf seldom exceed average gamma counts of 10 to 90 gamma ray counts per second. Therefore, it is unnecessary to use higher gamma emitting radioactive materials than the situation requires.

Naturally occurring radioactivity detectable by the gamma-ray log operation may be derived from three elements: potassium, thorium, and uranium. It has been found that various compounds, containing such natural gamma trace elements as uranium, potassium and thorium as their primary elements, are readily available and commonly marketed for various commercial purposes. Compounds such as Hydroxides and Nitrates of compounds containing elements like Thorium, Cerium, Aluminum, Magnesium and Calcium, have also been found to be viable substitutes for the high gamma radiation gamma tag markers currently in use. All of which are controlled elements in their pure form. However, these compositions are considered safe when stored or shipped in small quantities. Such compounds can be prepared having the desired properties or simply purchased off the shelf and then coding the sub with the gamma count specification. Improvements to the gamma ray tag marker sub also eliminate the need to package substantial quantities of the natural gamma ray emitting materials for use in well logging operations.

It is therefore an object of the instant invention to provide a natural gamma emitter sub to be placed in the drill string in the near proximity of the perforating tool.

It is an other object of the instant invention to provide a natural gamma emitter sub, which is detectable by the gamma, wire-line logging operation when passing through the joints of a drill string.

It is a further object of the instant invention to provide a natural gamma emitter sub that is both personnel safe and non-controlled by the N.R.C., E.P.A. or D.O.T.

It is still a further object of the instant invention to provide a natural gamma emitter sub with a gamma count of between 200–1000 gamma counts/sec. with the least amount of the gamma ray emitting material detectable for wire-line operations.

4. BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein.

5. DETAILED DESCRIPTION OF THE PREFERRED EMBODIMENT

Figure 1:
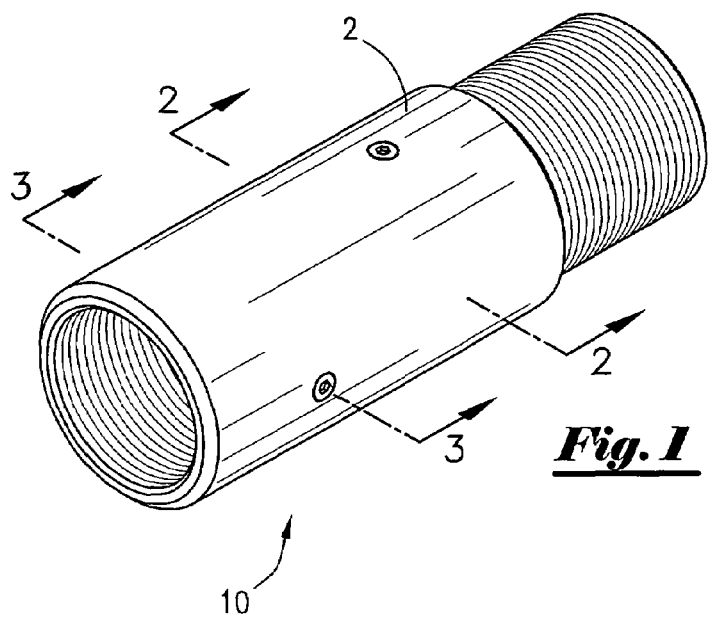
FIG. 1 is an isometric view of an improved gamma ray tag marker drill sub.
Figure 6:
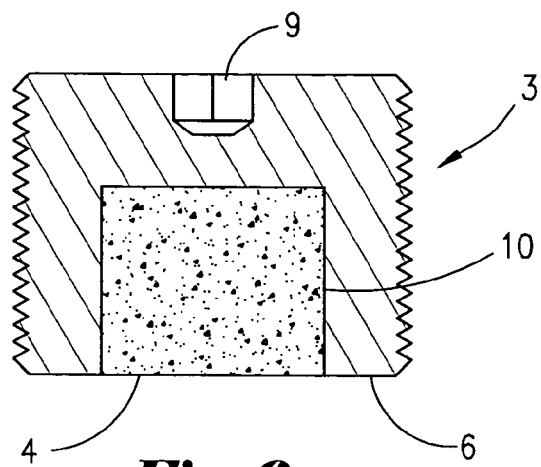
FIG. 6 is a cross section view of gamma ray insert.
Figure 9:
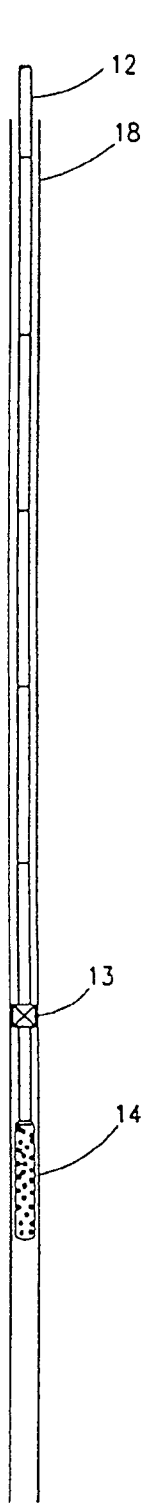
FIG. 9 is a schematic side view of a drill string utilizing a packer and perforator tool.

A first embodiment of the improved gamma ray sub joint, tag marker 10 is shown in FIG. 1. The elongated tubular sub joint 2 is generally configured for coupling into a down hole drill string 12, as seen in FIG. 9. The sub joint 2 further includes a plurality of threaded inserts 3 serving as a carriers for the low gamma ray emitting material 4. The threaded inserts 3, as better seen in FIG. 6, are threaded set screws 6 with a recessed geometric socket head 9 such as, but not limited to, a hexagon or octagon that is cooperative with a tool used for rotating the insert when threadably engaging the external threaded blind holes 5. An internal blind bore 8 is provided in the insert 3 located opposite the socket head 9 to receive the low gamma ray emitting material 4.

Figure 2:
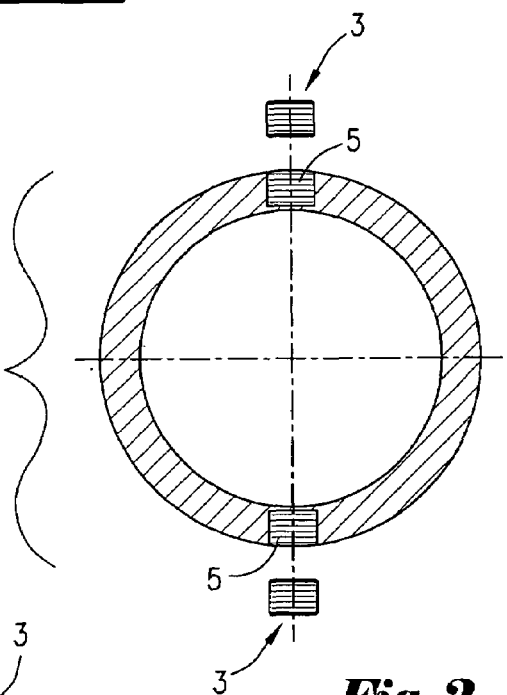
FIG. 2 is a cross section view of the tag market sub taken along sight line 2—2 as shown in FIG. 1.
Figure 3:
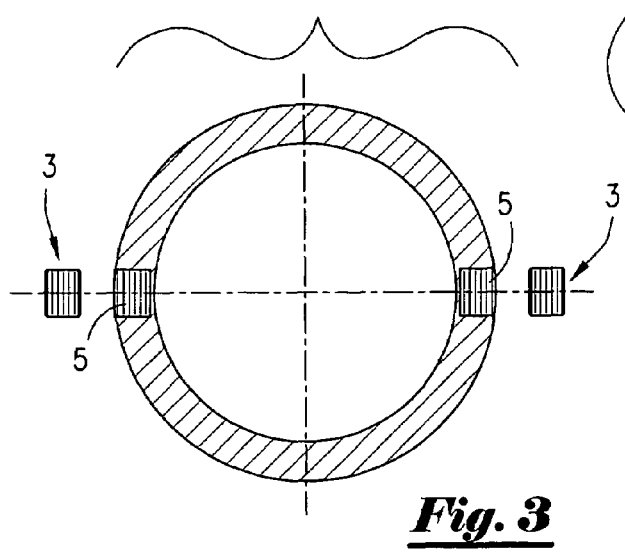
FIG. 3 is a cross section view of the tag market sub taken along sight line 3—3 as shown in FIG. 1.

Cooperative threaded internal blind bores 5 are located in the surface of the sub joint body 2 as shown in FIG. 2 and FIG. 3. In sub joints having internal longitudinal bores of 5¼ inch and above at least four threaded blind bores are provided in the joint body 2 for receiving the inserts 3, two of which are located opposite one another as seen in FIG. 2 and at least two more located at a distance spaced apart there from along the surface of the sub 2 and rotated 90 degrees as shown in FIG. 3. Additional inserts 4 may be added as desired in this spaced apart and rotated manner.

Figure 4:
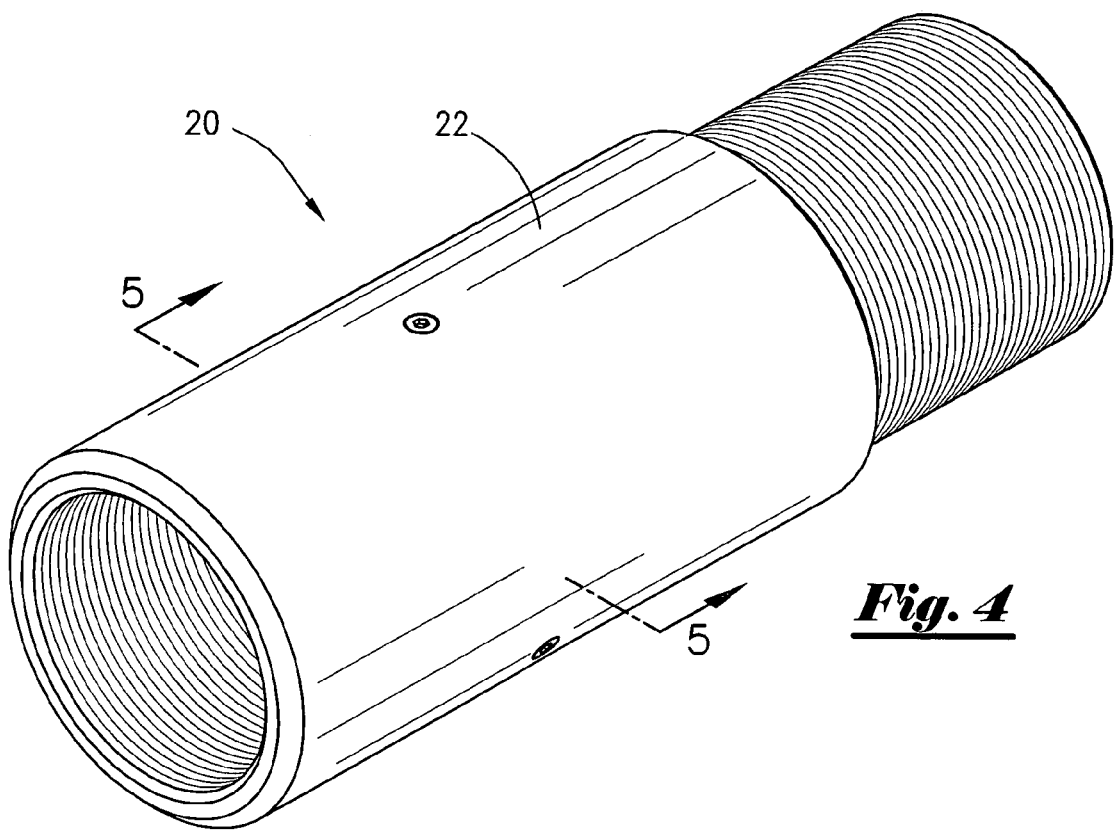
FIG. 4 is an isometric view of a second embodiment of a tag marker sub.
Figure 5:
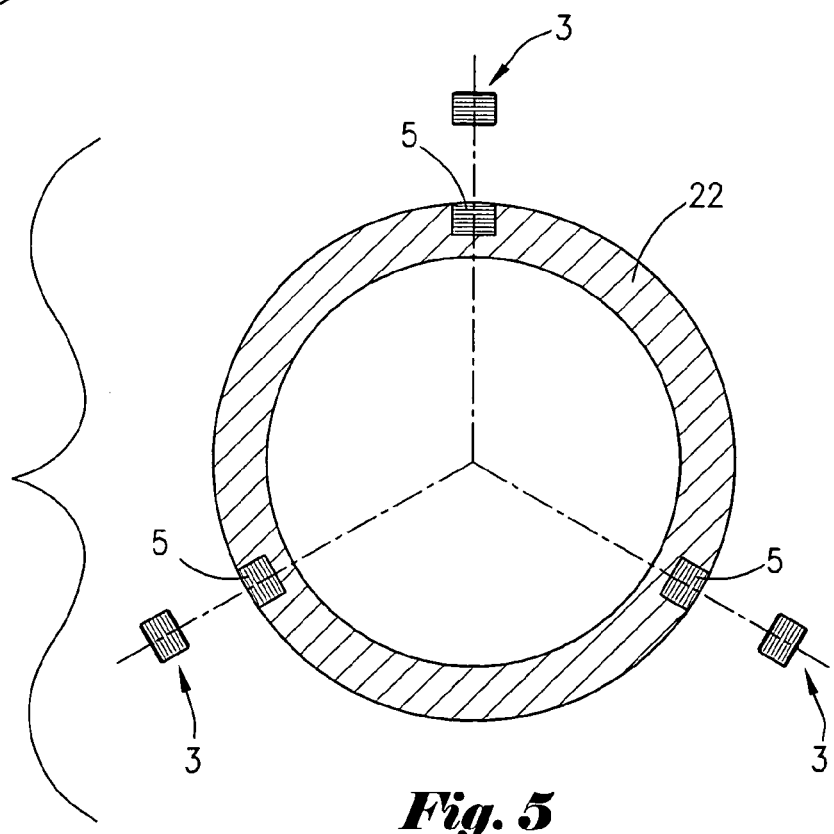
FIG. 5 is a cross-section view of the second embodiment of the tag marker sub taken along the sight line 5—5 as shown in FIG. 4.

In a second embodiment 20 seen in FIG. 4, where the internal longitudinal bore of the sub joint 2 is less than 5¼ inches the inserts 4 may be placed as shown in FIG. 5. In this case at least one set of three inserts may be located externally in the sub body 22 in a single plane perpendicular to the longitudinal bore 120 degrees apart.

Figure 7:
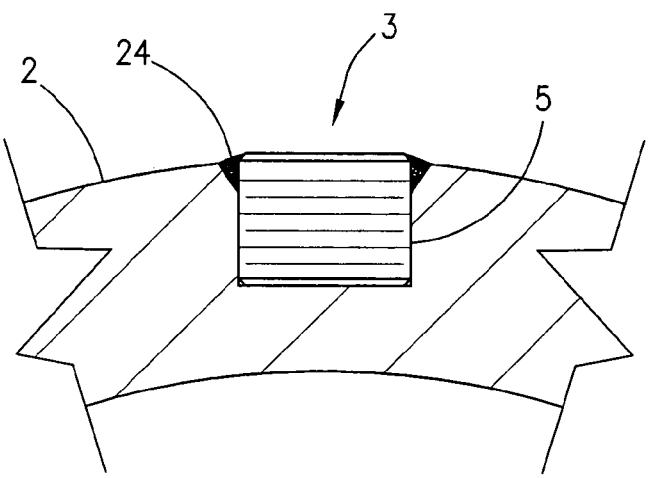
FIG. 7 is a partial cross section view of the gamma ray insert installed within the tag marker sub.
Figure 8:
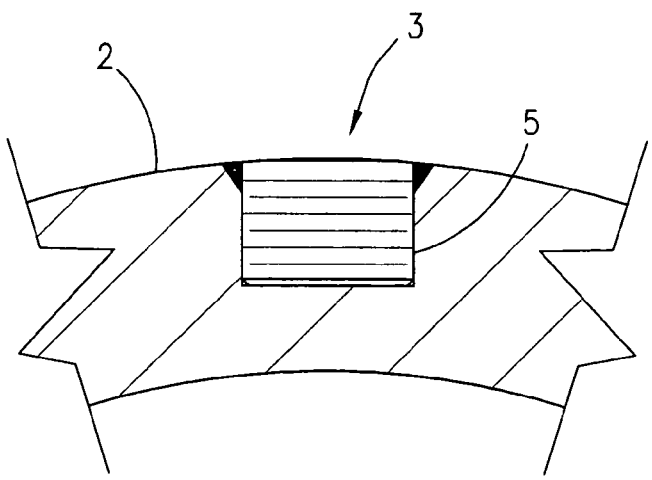
FIG. 8 is a partial cross section view of the gamma ray insert installed within the tag marker sub welded and finish ground.

The inserts 3 are installed within the threaded blind bores 5 and secured therein by a circumferential weld 24 as shown in FIG. 7. A portion of the weld 24 and the surface of the insert is then ground flush with the external surface contour of the sub joint 2, 22 as shown in FIG. 8.

Figure 10:
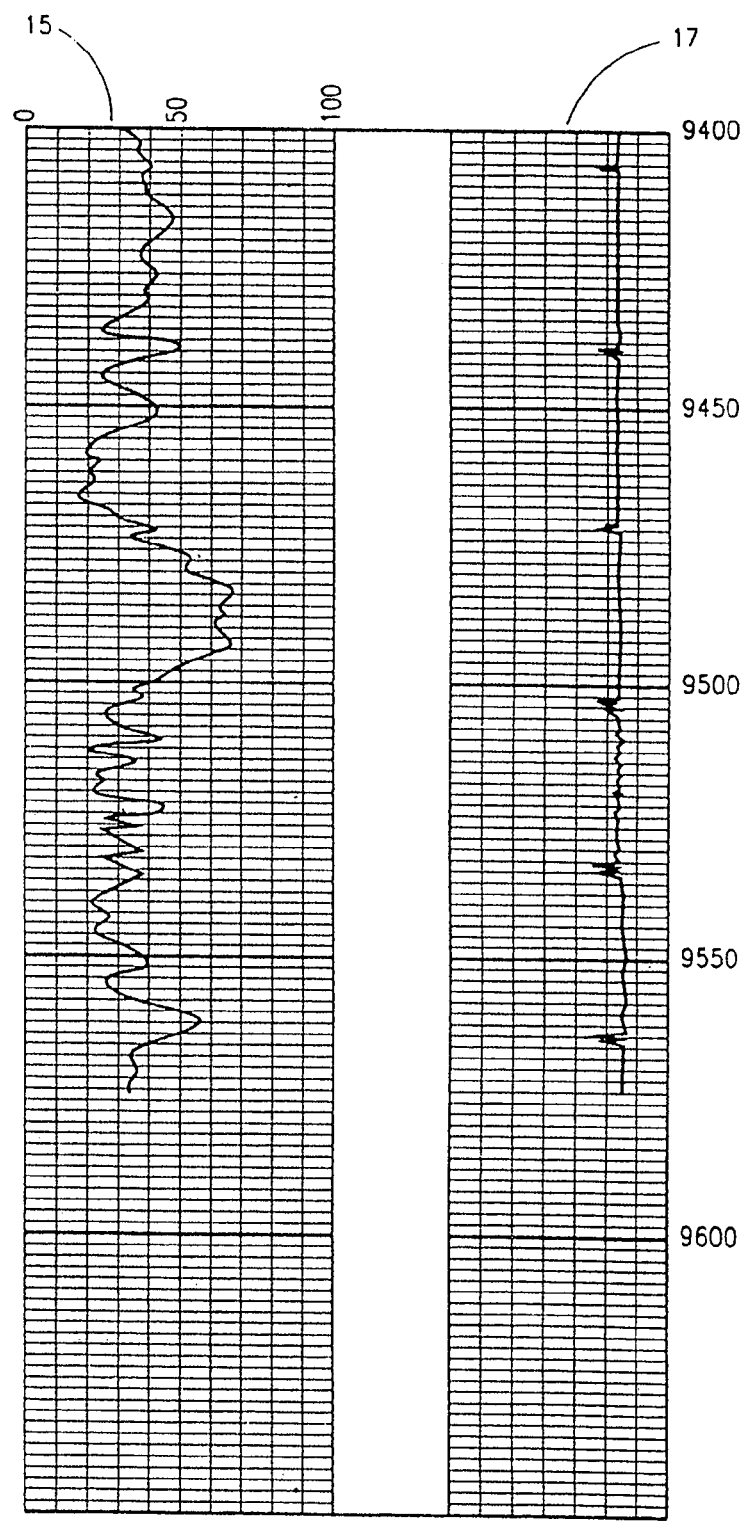
FIG. 10 is an initial subsurface gamma log and tubing collar locator.
Figure 11:
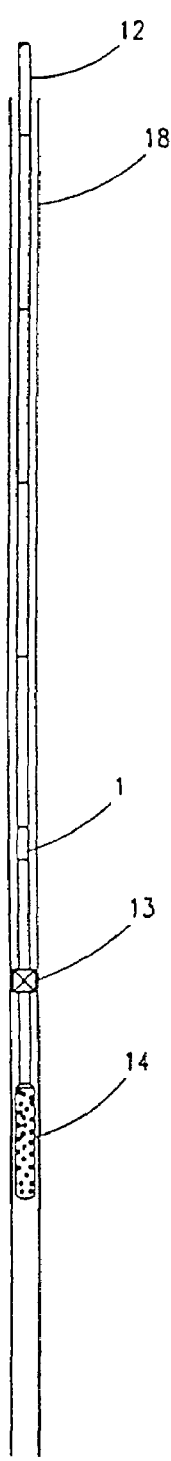
FIG. 11 is a schematic side view of a drill string utilizing a tag marker, packer and perforator tool.
Figure 12:
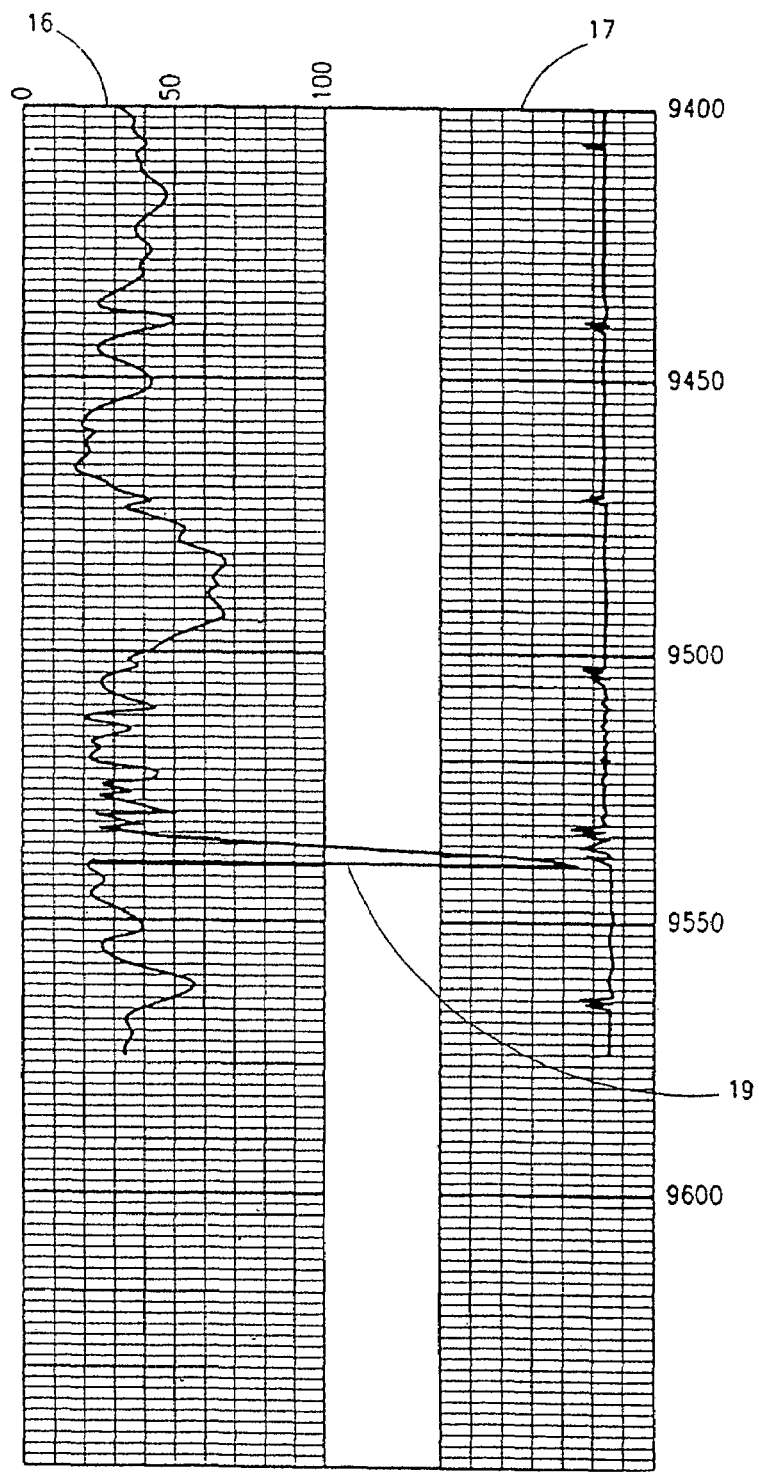
FIG. 12 is a through tubing subsurface gamma log with tubing collar locator showing gamma count spike created by the tag marker.

In use the natural gamma sub 10, 20 is placed in the tubing string 12 at the next joint above whatever tool joint is being used. For example, when perforating, the natural gamma sub 10, 20 would be placed at the joint adjacent the packer tool 13 which is directly above the perforator tool 14 as shown in FIG. 9, 11. In this manner when the initial casing well log chart 15 as shown in FIG. 10 is compared by over laying the through tubing log chart 16 as shown in FIG. 12 for the same well, the exact depth of the natural gamma sub 10, 20 is highlighted by the sharp gamma count spike 19 as referenced on the tubing collar locator track 17 as seen in FIG. 12. By knowing the exact measurement from the natural gamma sub 10, 20 to the top shot of the perforator tool 14, the perforator's precise location in the casing 18 is determined. As can be seen in FIG. 10 with the average gamma count of the surrounding sub-surface formations less than 100 counts per second, a gamma ray sub, such as the present invention, placed in the string with a known emission rate in excess or 100, would be sufficient for tag marking, in most cases.

It should be understood that although it is obvious that any natural occurring gamma emitting substance may be used as a tag marker as described herein. However, heretofore it has not been acknowledged that such small quantities of naturally occurring low gamma count emitting materials could be utilized in a satisfactory and safe manner for tag marking under such conditions.

It should also be understood that the preferred embodiment as described herein may not be the only method of delivery possible. The sub's design may vary, based on the job requirements, the particular substance used and the form in which it is commercially available.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. A gamma tag marker sub, for well logging comprising:
a) an elongated tubular sub joint for threadably coupling into a down-hole tubing string the sub joint having an internal longitudinal bore, a box end with internal tapered threads, a pin end with external tapered threads, and a external surface having a plurality of threaded blind holes therein;
b) a plurality of threaded inserts cooperatively inserted within the threaded blind holes; and
c) a naturally occurring gamma emitting compound, having a gamma count between 200 and 1000 counts per second, contained within the threaded inserts.

2. The tag marker sub according to claim 1 wherein said naturally occurring gamma material is a hydroxide or nitrate taken from a compound whose primary element is chosen from the group consisting of potassium, thorium, and uranium.

3. The tag marker sub according to claim 1 wherein the threaded blind holes are located opposite each other in at least one plane perpendicular to the longitudinal bore.

4. The tag marker sub according to claim 1 wherein the threaded blind holes are located 120 degrees apart from each other in at least one plane perpendicular to the longitudinal bore.

5. The tag marker sub according to claim 1 wherein the threaded inserts comprise a geometric recessed socket cooperative with a tool for rotatably turning the insert when engaging the threaded blind hole.

6. The tag marker sub according to claim 5 wherein the threaded inserts comprise a blind bore located opposite the recessed socket for receiving the gamma-emitting compound.

7. A method for assembling and using a low gamma count marker in a down-hole tool string for wire-line logging comprising the steps of:

a) loading a plurality of threaded inserts with a gamma ray emitting compound having a gamma count of between 200 and 1000 Counts/sec.; and b) installing the threaded inserts into a plurality of cooperatively threaded blind holes located in the exterior surface of a tubular sub joint.

8. The method for assembling and using a low gamma count marker according to claim 7 wherein the method further comprises the step of securing the inserts within the sub joints by circumferentially welding each insert to the sub joint and grinding the weld and insert flush with the curvature of the sub joint.

9. The method for assembling and using a low gamma count marker according to claim 7 further comprising the steps of comparing a logging chart of the drill string prior to the insertion of the gamma tag marker sub with a chart with the gamma sub marker, the marker having a gamma count only slightly higher than the naturally occurring gamma radiation of the surrounding formation, and noting the precise location of the gamma marker within the drill string.

\* \* \* \* \*